Jan. 8, 1946.   G. S. BAYS   2,392,357
WELL LOGGING
Filed June 8, 1942   3 Sheets-Sheet 2
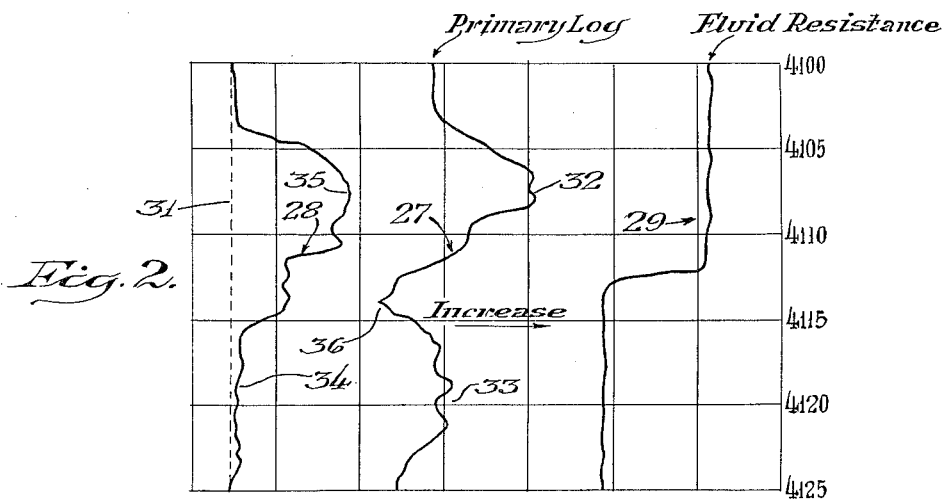
Fig. 2.
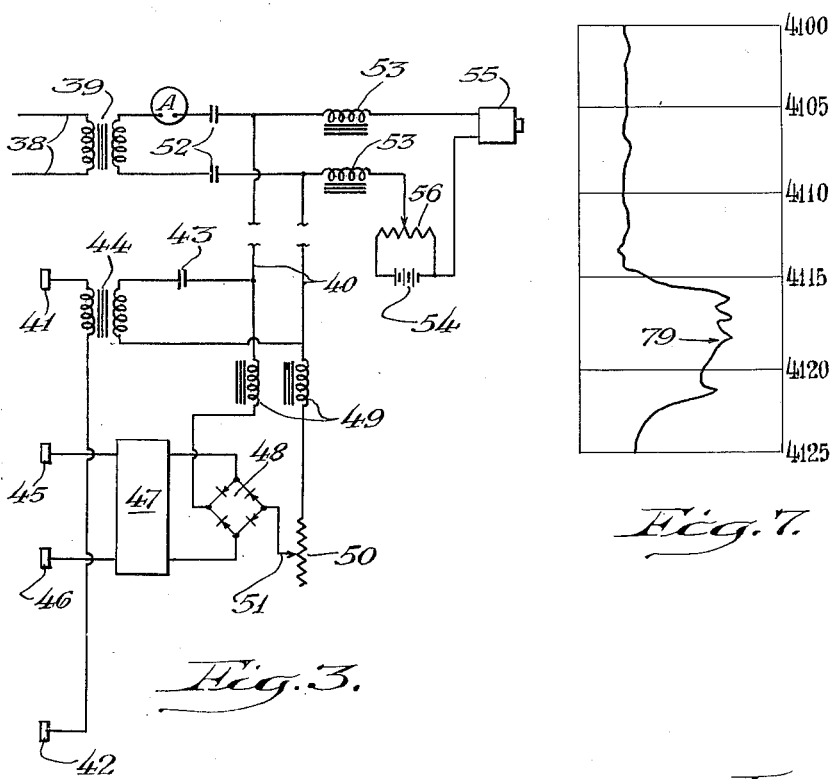
Fig. 3.
Fig. 7.
Inventor:
George S. Bays.
By Paul F. Hawley
Patent Agent Jan. 8, 1946.　　　　　G. S. BAYS　　　　　2,392,357
WELL LOGGING
Filed June 8, 1942　　　3 Sheets-Sheet 3

Inventor:
George S. Bays
By Paul F. Hawley
Patent Agent

Patented Jan. 8, 1946

2,392,357

UNITED STATES PATENT OFFICE 2,392,357

WELL LOGGING

George S. Bays, Tulsa, Okla., assignor to Stanolind Oil and Gas Company, Tulsa, Okla., a corporation of Delaware Application June 8, 1942, Serial No. 446,277

2 Claims. (Cl. 175—182)

This invention pertains to the art of well logging, and more particularly deals with the correction of a primary well log for the character and the volume of the fluid in the bore hole. By the term "primary well log" as used herein is meant the plot of some characteristic of the strata traversed by a well bore as a function of depth without regard to the several variables which may make up the total measured effect. Thus, for example, it will be apparent that the ordinary radioactivity log of a bore hole which simply records total radioactivity regardless of source, variable absorption and other factors is a primary well log.

Various primary methods of well logging, for example natural potential, resistance through an earth circuit, gamma ray, and neutron logging, are now well known and their place has been established in the oil industry. Their use has increased in the oil industry in spite of many unexplainable inconsistencies which are caused by the fact that they are often considerably affected by other factors. It has been suggested that the accuracy of these logs might be affected by the character of the fluid in the hole, as well as by variations in the diameter of the hole, and this invention is directed to making a primary well log simultaneously with a log of the variables which affect it, to remove adequately the recognized deficiencies.

For example, in the ordinary earth circuit resistance log, the following relation exists: the measured or apparent earth circuit resistance $R_p$ is a function of the specific resistivity $R_f$ of the formations, the specific resistivity of the well fluid $R_c$ at the various points involved, and the diameter D of the bore. Both $R_c$ and $R_f$ are in turn functions of the well temperature.

The following table demonstrates the significance of changes in $R_c$ with changes in normality, due to sodium chloride and temperature of the fluid.

| Normality | $R_c$ ohms/cm.$^3$ at— | |
|---|---|---|
| | 18° C. | 100° C. |
| 0.000 | | |
| 0.002 | 4.7340 | 1.4320 |
| 0.010 | 0.9804 | 0.02678 |
| 0.080 | 0.1336 | 0.0415 |
| 0.100 | 0.1008 | 0.0337 |

It is quite generally conceded that $R_c$ should be as small as possible for maximum sensitivity in making any earth circuit resistance ($R_p$) log. As indicated above this log is a function of both $R_c$ and $R_f$ and relative effects of each are dependent somewhat on the relative volumes of each in the circuit through which currents travel in making the log. Since $R_c$ is generally much greater than $R_f$, the measured resistance $R_p$ increases as the well diameter D increases. Furthermore, regardless of changes in D, $R_p$ decreases as the ratio $R_c/R_f$ increases. Similarly, as the ratio $R_c/R_f$ decreases $R_p$ increases.

From the above it is evident that the effects of the change in fluid resistivity, temperature and bore hole diameter on primary measured earth circuit resistance cannot be neglected. It has been found that an appreciable change in any one of these factors may possibly mask the change in formation resistivity, thus destroying the value of the customary apparent resistance log.

The specific resistivity of oil from an average oil well is many times the specific resistivity of an average brine from the same well. To make an intelligible apparent resistance log of a subterranean formation it is desirable that a fluid of relatively low resistivity be used to condition the well bore before the log is made in order to increase the sensitivity to changes in the formations. In spite of the most exacting precautions, stratification of the fluid will invariably occur while the conditioning pipe is being removed and the logging instrument lowered to the test section.

From the above table, which indicates the effect on the fluid resistance of a change in temperature from well head conditions to bottom hole conditions in a well, it would seem that the effect of temperature change on the primary resistance log could not be neglected. I have found, however, that if a correction is made for temperature, the log gives the primary earth-circuit resistance at a standard temperature, whereas if no correction is made for temperature the log gives the variation in primary earth-circuit resistance at in-place temperatures. The latter is usually preferred, since it is not considered necessary to know the measured earth-circuit resistance of a formation at a standard temperature. On the other hand, when it is desired to compensate a primary log for a temperature anomaly, I have found it convenient to use the method and apparatus disclosed in U. S. 2,330,394 issued on copending patent application 347,570 of Robert W. Stuart combined with the apparatus subsequently herein disclosed.

In comparing logs of a bore hole taken at different times, I have discovered that an accurate reproduction is rarely ever obtained. This is especially true where the logs are of the redioactive properties of the strata. Since the fluid in the well is usually of varying character, it is therefore impractical to attempt to correct a primary log for the effect of the fluid in the bore hole when the primary log and the measurement of fluid character are taken at substantially different times.

It has long been recognized that when a logging instrument is lowered into a deep well there is an appreciable stretch in the cable which cannot be readily ascertained. At least one method has been proposed to evaluate this stretch in which a detectable substance is accurately located at a reference point in the well near the producing formations, so that depths can be computed from the reference point rather than from the surface. Although proposed, this method has not found favor in the art due to obvious difficulties and the expense involved. On deep wells, for instance, it has been found that this stretch of the cable amounts to from 5 to 25 feet depending on a number of variables such as weight of the logging instrument, the fluid velocity, the instrument shape, the fluid density, the nature of the cable, etc. It is almost impossible, therefore, to attain identical conditions when two logging instruments are lowered individually into a well. Although the measuring device may indicate equal depths of two different logging instruments run individually, the variations in actual level could easily amount to as much as 10 or 15 feet, making it impossible to correlate readings from thin strata. Although many of our present important producing formations are found in narrow-veined deposits, there is no doubt but that in the past many of these veins have been overlooked due to the inability to correlate strata.

It is therefore an object of this invention to provide a method of and means for modifying a primary log of the subterranean formations in a well bore, in accordance with a characteristic of the bore hole. This characteristic may be the well diameter, the composition of the well fluid, or other variable associated only with the size of the bore hole and its contents. It is therefore an object to provide a means for automatically correcting a primary well log for changes in bore hole diameter. Another object of this invention is to provide a means for automatically correcting a primary well log for fluctuations due to the character and volume of the fluid in the bore hole at the same time and point that the primary log is made. Another object of this invention is to provide means for correlating primary logs with corrective logs by eliminating inaccuracies arising from elongation of the logging cables. Still another object of this invention is to make a log of the strata traversed by a bore hole, which log is automatically corrected for the amount of and properties of the fluid in the bore hole at each point, thus overcoming inaccuracies arising from the stretch of the logging cable and from transient anomalies of the bore hole diameter and the fluid physical or chemical character.

The foregoing objects together with other objects will be apparent from the following description taken in connection with the accompanying drawings which form a part of this specification and are to be read in conjunction therewith, in which:

Figure 2 is a reproduction of a well log made by the apparatus shown in Figure 1;

Figure 3 is a wiring diagram for a four-electrode, resistance logging system applicable to the apparatus of Figure 1 by the use of which the primary log is corrected for the effect of diameter changes;

Figures 5A and 5B are vertical cross sections of adjoining parts of a logging device built according to my invention;

Figure 7 is a reproduction of a log of the section shown in Figure 2 obtained by automatically combining the three variables recorded in Figure 2, through the use of the apparatus shown in Figures 5 and 6;

Figure 1:
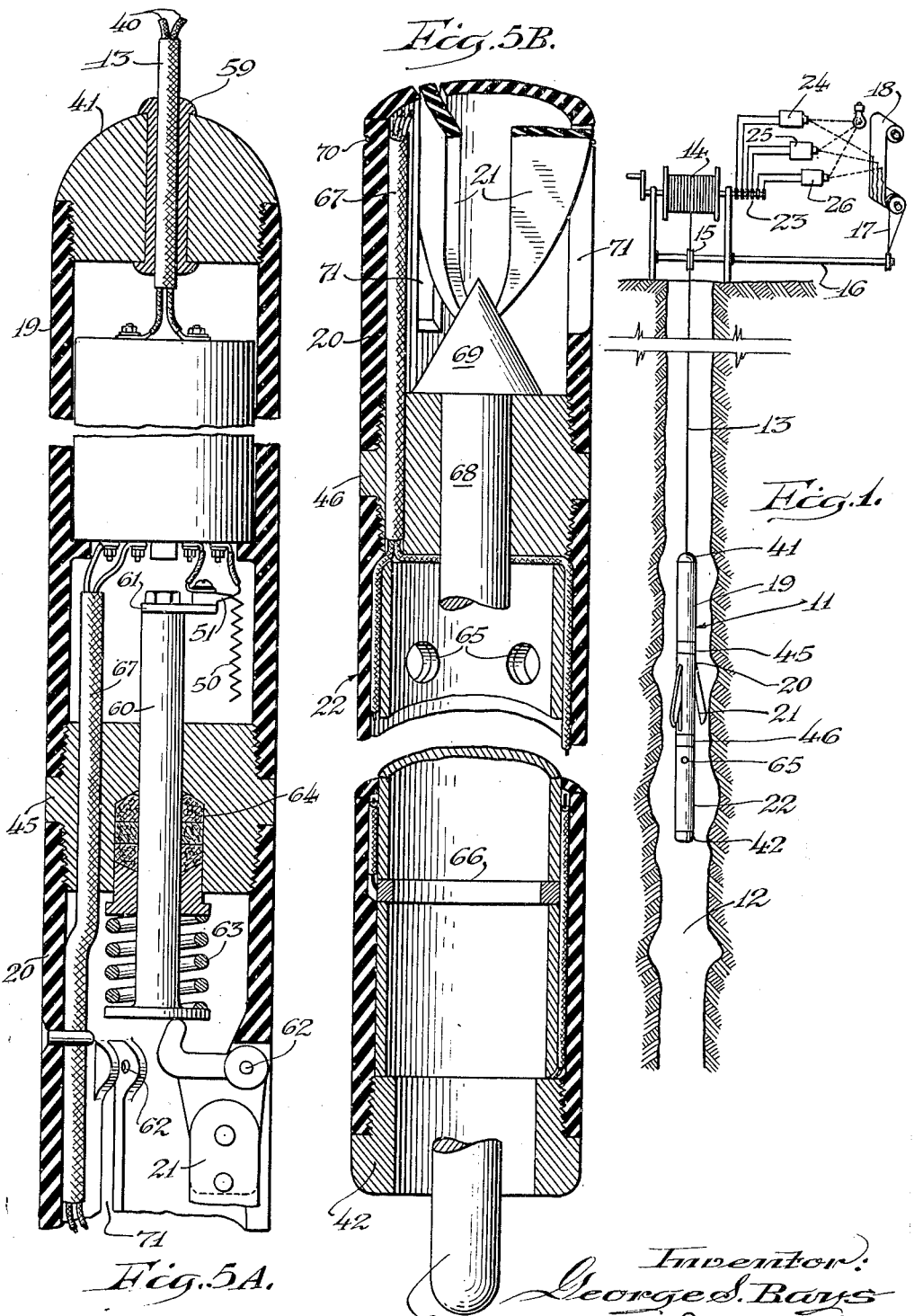
Figure 1 is a diagrammatic view of a cross-section of a well and apparatus for simultaneously making a well log and measurements of bore hole characteristics.

Referring now to Figure 1, a combination logging device 11 is lowered into a bore hole 12 on an insulated cable 13. The cable 13 is wound onto the reel 14 at the surface in a manner well known in this art. The cable 13 passes over a measuring sheave 15 as the logging instrument is moved through the well. This measuring sheave 15 is connected through suitable mechanical connections represented by the shaft 16 and the belt and pulley arrangement 17 to drive the recording medium 18. Thus the traces or logs on the medium are in direct correlation with the depths at which they are taken. Other methods of correlating the recorder operation with the movement of the exploring device 11 up and down the well bore may be used, as, for example, a Selsyn transmission system, as has been described in the prior art.

In a section 19 within the logging device 11 is placed equipment for obtaining a primary log, such as an ionization chamber or Geiger-Mueller counter together with the necessary electrical appurtenances, for use in gamma ray or neutron logging, or the wiring equipment necessary for earth circuit resistance, natural potential, or other logs. The intermediate section 20 of the logging device consists of a well caliper device, with arms 21 which bear against the walls of the well 12 as the device is being withdrawn from the well. As is described more fully hereafter, an electric signal proportional to the extension of the caliper arms 21 is transmitted through cable 13 to the surface.

Within the lowest section 22 of the logging device are suitable devices for producing an electrical signal proportional to the character of the fluid, used for correcting the primary log for the character of the fluid. As pointed out later in more detail, the fluid in the hole circulates through this section 22 as the device is raised or lowered within the well. The electric output from each of these sections 19, 20 and 22 is transmitted through conductors of the cable 13 to the surface where the ends of the conductors of cable 13 are connected to slip rings 23, from which the electric signals are conducted to the detecting devices 24, 25, and 26 for recording on the film 18 as a primary log 27, caliper log 28 and fluid resistance log 29 respectively, as shown in Figure 2.

As stated above, Figure 2 represents a magnified section of a well log produced by the equipment shown in Figure 1. In the traces an increase in primary earth circuit resistance, diameter, and fluid resistance is represented by the direction of the arrow. This log will now be explained in more detail.

The section from 4100 to 4103 feet is a hard dense material of medium resistivity (evidently dolomite) as indicated by the primary earth circuit resistance log 27, and caliper log 28 which shows that the hole is of approximately the same diameter as the bit, the deflection proportional to the bit diameter being represented by the dotted line 31. The fluid in the hole was of a relatively high resistance as indicated by the conductivity log 29.

In the section 4103 to 4111 feet it will be noted that there is a great increase in the diameter of the hole and a like increase in the primary earth resistance, but no change is noted on the fluid resistance trace. Prior to this invention it might have been interpreted that this increase in resistance as indicated by the peak 32 represented a high impedance formation which was probably a porous section saturated with oil. By comparison with the caliper log, which indicates that the formation in this section has been extensively eroded, and the fluid resistance log which indicates no change in fluid character as compared with the section immediately above, it appears that the change was due to the increase in volume of the high resistivity conditioning fluid, and that this section is probably a shale instead of a producing sand as indicated by the primary earth circuit resistance log considered above. Within the section 4111 to 4115 feet, there is a further change in the formation as indicated by the caliper log 28 and the primary resistivity log 27. This section, although not distinguishable on trace 27 due to a change in the conductivity of the fluid in the well at 4112 feet is believed to be a sandy shale.

Below 4115 feet there is an increase in earth circuit resistance indicated by the minor peak 33, which prior to this invention would not have been considered of any importance. It is known that a sand formation like many other harder strata is not eroded badly by the drilling fluid. The uneroded section 34 of the caliper log, therefore, might indicate a sand formation. Now, by comparing primary trace 27 with those traces of the caliper and fluid resistance, it may be noted that this is a highly resistive sand such as might be expected to contain oil. The peak 33, being less than peak 32 on the primary resistivity log, taken by itself would be held to indicate a low resistivity section of no importance, which might, prior to this invention, have been cemented off. The distinct change in the measured resistance of the fluid at 4112 feet is evidently representative of an interface between the water and oil in the well.

This change in fluid resistivity at 4112 feet accounts for the difference in the heights of peaks 32 and 33 on primary resistivity trace 27, showing that the character of the fluid at the point of interest cannot be neglected. Peak 32 now is easily accounted for by reference to the other two traces which show that the cavity in the shale between 4103 and 4112 feet was filled with a dielectric fluid such as oil.

Below 4122 feet it will be noted that the primary earth circuit resistance trace 27 decreases while neither of the other traces indicates a change. This resistivity decrease suggests that the oil-water interface in the formation is at roughly 4122 feet. This pay formation being so thin might easily have been overlooked had not my invention been used. For instance, had the resistivity and caliper traces been made with individual instruments, the caliper being heavier than the customary electrodes used in an earth resistance survey, would probably have stretched its suspension cable about eight feet more, making the trough 36 on the resistivity log fall opposite the peak 35 on the caliper log. In that case the log of the high resistivity section 4103 to 4112 feet would have fallen opposite the dolomite section above 4103 making it appear that the producing formation was a sand above 4103 feet.

In Figure 3 I have shown a wiring diagram of apparatus for making a four-electrode earth resistance survey and means for correcting this survey for change in well diameter.

A source of alternating current is connected across conductors 38 to a constant-current transformer 39. This alternating current is transmitted through the leads 40 within cable 13 to the logging apparatus in the wall. The equipment which is shown at the lower ends of leads 40 may be conveniently located within section 19 of the logging device 11 as shown in Figure 1. The alternating current is applied to current electrodes 41 and 42 through condenser 43 and transformer 44. Across any intermediate section of the well between electrodes 41 and 42 there is a potential drop that depends upon spacing of the electrodes, fluid volume and character, formation resistivity, etc. The voltage drop across potential electrodes 45 and 46 which preferably are spaced apart of the order of two to five diameters of the hole, may conveniently be proportionately increased in the amplifier 47.

A full-wave rectifier 48 converts the output of amplifier 47 into a direct potential so that it may be transmitted without interference to the surface over the same two leads 40 which were used to transmit power to the logging device. Choke coils 49 isolate the rectifier 48 from the alternating current in leads 40 according to well known usage. The condenser 43 is for a similar purpose in that it prevents the direct potential from being impressed across power electrodes. Variable resistance 50 is included in the direct potential circuit to compensate for changes in well diameter. As is described more fully subsequently, the well caliper arms 21 are mechanically linked to the slider 51 on resistance 50. Thus, increase in the well diameter decreases the value of the resistance 50 in the direct current circuit, so that the recording current is increased, thereby automatically compensating for the decrease in potential drop across electrodes 45 and 46, due to the increase in well diameter.

At the surface condensers 52 and choke coils 53 separate the power and recording potentials. The recording circuit at the surface consists of a battery 54, a detecting device 55 such as an oscillograph galvanometer, and a resistance 56 forming with battery 54 a voltage divider which is used to obtain a zero adjustment of the single trace recording which in this case forms a log of corrected earth circuit resistance, corrected only for volume of the fluid in the hole.

The apparatus shown diagrammatically in the wiring diagram of Figure 3 may suitably be used in the logging device 11 shown in Figure 1. In this case the ends of the instrument 41 and 42 are current electrodes while the potential electrodes 45 and 46 are constructed of conducting sections in the instrument. Intermediate sections 19, 20 and 22 are in this case of non-conducting material, such as Bakelite.

Figure 4:
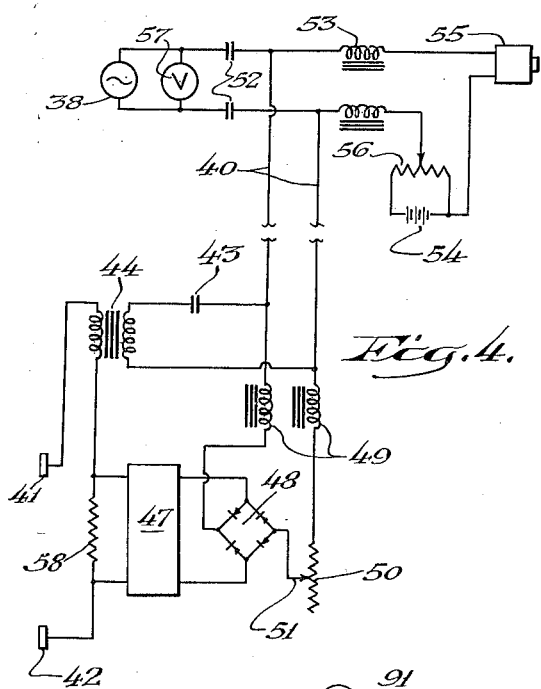
Figure 4 is a wiring diagram of a modification of the system shown in Figure 3 for a two-electrode, resistance logging system.

A slight modification of the apparatus of Figure 3 is shown in Figure 4, the main difference being that the apparatus shown in Figure 4 is for use with a two-electrode logging system. In this case a constant potential is applied by alternator 38 through condensers 52 to conductors 40, energizing transformer 44 through condenser 43, so that alternating current is applied across electrodes 41 and 42, which are thereby maintained at a constant potential difference. The magnitude of this drop is proportional to the indication of the voltmeter 57. Changes in the resistivity of the formation are indicated by the changes in the potential drop across resistance 58 which is connected in series with the power supply between electrodes 41 and 42. This potential drop is amplified and rectified as shown in the circuit of Figure 3. The drop across resistance 58 is affected by the volume of fluid in the well between electrodes 41 and 42. Since the volume of the fluid in the hole varies as the square of the diameter and since the motion of slider 51 varies linearly with the diameter, the variable resistance 50 is wound so that the resistance per unit length varies as the square of the distance from the end, in order to compensate directly for change in volume.

A modification of the logging device 11 is shown in Figures 5A and 5B. Conductors 40 in cable 13 pass through electrode 41 into section 19 where I preferably place the electrical equipment associated with the cable and electrodes, as shown in Figure 3 or 4. Section 19 must be separated from the fluid in the hole so a packing gland 59 of any suitable design is used.

As previously stated, the caliper arms (which may be made of any non-conducting material such as wood or moulded plastic), occupy the central section 20 of the logging device. Since slider 51 is connected to but insulated from shaft 60 by an insulator 61, the movement of the caliper arms is registered by a change in resistance 50. Caliper arms 21 are rotatably mounted on the non-conducting wall of section 20 and rotate about pins 62. Variations in the diameter of the hole are transmitted through arms 21 to the shaft 60, which moves longitudinally of the instrument with a change in diameter. It will be apparent that any number of caliper arms may conveniently be used, but I prefer three arms as shown. Spring 63 tends to force the caliper arms 21 against the walls of the hole and in turn centers the logging device 11 in the hole. The spring also compresses a packing gland indicated generally at 64 which prevents contamination of section 19 by the fluid in the hole. Section divider 45 between sections 19 and 20 when used on a four-electrode system forms a potential electrode and hence can be of any conducting material, but, as explained later, when a two electrode system is used, the section dividers such as 45 are preferably of a non-conducting material.

A device suitable for correcting a primary log for the character of the fluid, such as a pair of electrodes, an ionization chamber, a Geiger-Mueller counter, etc., may be placed within section 22. It will be noted that lower electrode 42 is cylindrical to permit flow of fluid through this section as it traverses the bore hole. At the upper end of the section, holes 65 are provided through which the circulation is completed. In the particular device illustrated, a fluid conductivity cell is shown which is composed of electrodes 66 and 42. Two electric conductors within cable 67 connect the apparatus in section 19 with electrodes 66 and 42 as shown in Figures 5A and 5B. The drop of potential across electrodes 42 and 66 is a direct function of the fluid resistivity at the point of measurement. This voltage is used to correct the primary logging indication as explained below.

Before operations start, caliper arms 21 are preferably tied in collapsed position by string or fine wire 70. Then the logging device is lowered to the bottom of the hole. The instrument may be energized as it is lowered through the well to give a primary log of formation corrected only for fluid character. The change in diameter will obviously not be incorporated in this log since the caliper arms 21 are restrained by string 70, keeping resistance 50 constant. When shaft 68 strikes the bottom it raises cone 69, which in turn spreads caliper arms 21, breaking string 70 holding the arms together. A slot 71 in the insulated section 20 is provided for movement of each caliper arm when it is released.

Figure 6:
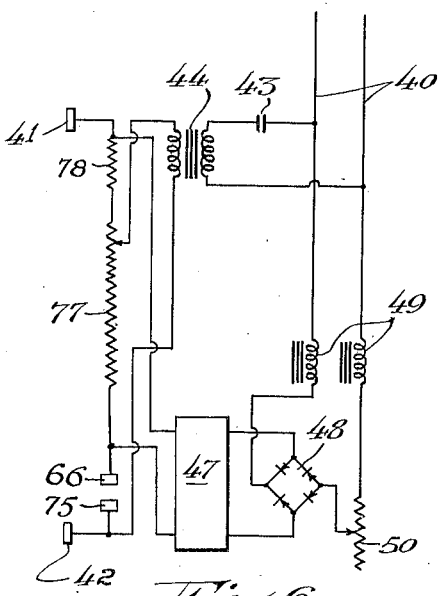
Figure 6 is a wiring diagram of electrical apparatus used in connection with the logging device shown in Figures 5A and 5B.

A preferred wiring diagram for this embodiment of the invention where the primary log is of the earth circuit resistance is shown in Figure 6. This circuit is in effect a bridge which is energized from the surface as in Figure 4 by a constant alternating potential through conductors 40, condenser 43 and transformer 44. This circuit, in effect, corrects the primary earth circuit resistance for the effect of varying fluid character as well as the volume of the fluid in the hole. Electrodes 41 and 42 are resistivity electrodes used in the manner described in connection with Figure 4, while the pair of electrodes 66 and 75 constitutes the conductivity cell in which the character of the fluid is determined. Resistivity electrode 42 and conductivity electrode 75 may be combined into one and the same electrode, since they are at the same potential. See, for example, Figure 5B. Balancing resistance 77 in the bridge should be substantially higher than resistance 78 due to the difference in effective total resistance between the resistivity electrodes on the one hand and the conductivity electrodes on the other. Since the conductivity of the earth is generally of the order of 0.1–10 ohmmeters and the conductivity of common drilling fluids is of the order of 2000–5000 ohmmeters, and since the spacing between electrodes 41 and 42 may be from 10 to 100 times as great as the spacing between conductivity electrodes 66 and 75, the ratio of resistance 77 to resistance 78 may be, for example, 100. Thus, for example, resistance 77 may be of the value of 1000 ohms while resistance 78 may be of the value of 10 ohms.

The unbalance of this bridge network which is representative of the difference between primary measured earth circuit resistance and measured fluid resistance, may be amplified by amplifier 47 and then rectified as shown in the circuits of Figures 3 and 4. The direct potential output of the full-wave rectifier 48, is then corrected for change in fluid volume in the section of the well being logged by movement of slider 51 on tapered resistance 50, and the resultant signal is transmitted to the surface over conductors 40. This signal is manifestly proportional to the total primary earth circuit resistance corrected for the effect of variation in fluid character, and for the resistance change due to well diameter variation.

The same section logged in Figure 2 yields a log such as is shown in Figure 7 when the primary log is automatically combined with its corrections. In this case the peak 79 through the section 4115 to 4122 feet points out clearly the oil producing section. It is apparent from the comparison of the primary trace 27 shown in Figure 2 and the corrected trace of Figure 7 that the ease and correctness of interpretation of the corrected log is markedly increased.

As mentioned previously, this invention is not limited to correcting a log of the electrical character of the formation as represented by a resistance or natural potential log, but may be applied equally to gamma ray or neutron logging.

Figure 8:
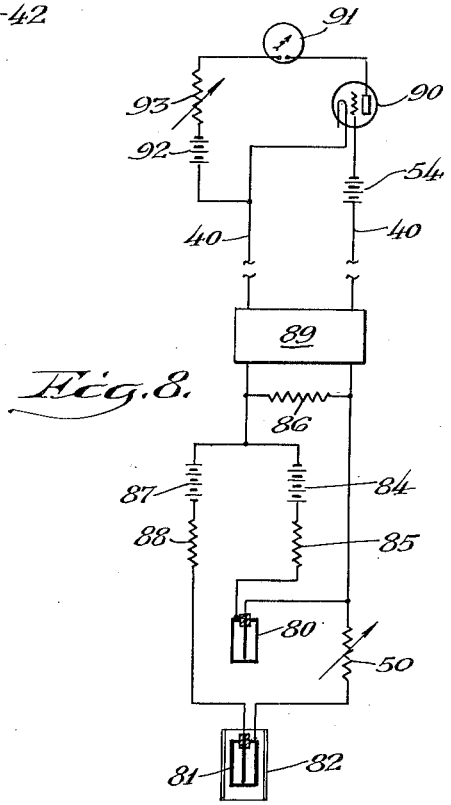
Figure 8 is a wiring diagram for another embodiment of my invention.
Figure 9:
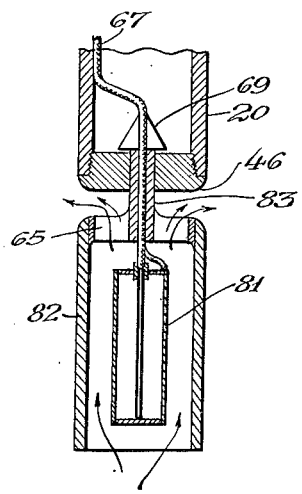
Figure 9 shows a vertical cross section of part of an apparatus which is a modification of that shown in Figure 5.

Figure 8 represents a wiring diagram of a modification of the instrument shown in Figure 1 for making a corrected gamma ray well log. In this case all radioactivity, both from the formation and from the fluid in the hole, is detected by the ionization chamber 80, which is preferably suspended between the caliper arms of central section 20. As in the other embodiments, the auxiliary amplifying and other equipment is placed in the upper section 19, but in this instance, the lower section 22 is replaced by the apparatus shown in Figure 9, in which a second ionization chamber 81 is suspended within a cylindrical shield 82 from the chamber 20. This shield 82, which may be of any dense material such as lead, allows only radiation from the fluid to reach ionization chamber 81. A representative sample of the fluid adjacent the primary ionization chamber 80 at any point in the bore hole simultaneously surrounds the correction chamber 81 since the fluid is allowed to circulate through this section past the ionization chamber 81 and out the perforations 65 as the logging device is lowered through the hole. The output from this shielded chamber 81 indicates only radiations from the mud since radiations from the formation are absorbed by the shield 82.

In Figure 8 the battery 84 supplies current to the primary ionization chamber 80, through resistance 85 and common resistance 86. Battery 87 supplies current in an opposite direction through common resistance 86 to the compensating ionization chamber 81, resistance 88, and variable resistance 50, which is varied as previously explained, by change in diameter of the well bore. It is apparent that currents from the two ionization chambers are in opposition through common resistance 86, so that the resultant potential across this resistance is proportional to the difference in the outputs of the two ionization chambers, hence is indicative of the absolute radioactivity of the formation. The total measured radioactivity indication is corrected for the radioactivity due to the character and volume of the fluid. The potential across common resistance 86 is applied to the input of amplifier 89, the output of which is transmitted to the surface through conductors 40, amplified farther, if desired, as by a triode tube 90, and indicated or recorded by a galvanometer 91. A battery 92 supplies current for the recording and amplifying circuit at the surface. It is usually desirable to incorporate a variable resistance 93 in this circuit for volume control, as is well known in the art.

In order that the caliper arms may be released when the instrument reaches the bottom of the hole, the shaft 68 as seen in Figure 5B is replaced with a suitable perforated head 83 in the lead shield 82. In this case when the logging device strikes bottom, cone 69, as in Figure 5B, strikes the ends of caliper arms 21, breaking their binder and releasing them, so that the well may be calipered as the logging device is raised through the well.

While I have described a primary log corrected for certain variables, it is to be understood that I propose to correct a primary log of any variable which can be measured in an oil or gas well for changes in any bore hole characteristic. It is clearly to be understood that by bore hole characteristic I refer only to the physical dimensions of the bore hole and the physical or chemical properties of the fluid within the bore hole as measured in the section of the well being logged, as distinguished from any characteristic associated with or due to the properties of the surrounding formations or the fluids contained in those formations.

I claim:

1. A method of logging the strata traversed by a bore hole filled with fluid which consists in producing a voltage proportional to the apparent electrical specific resistivity of said strata at different depths in said bore hole, simultaneously producing a second voltage proportional to the resistivity of said fluid at said depths in said bore hole, modifying said second voltage in inverse relationship to the bore hole diameter at the same depths in said bore hole, and producing an indication proportional to the difference in said voltages.

2. A method of logging the strata traversed by a drill hole filled with fluid comprising passing an electrical current between two spaced points in said hole, producing a first voltage proportional to the impedance to flow of said electrical current, producing a second voltage proportional to the impedance of said fluid only, applying the difference in said voltages to a variable impedance, varying the value of said impedance inversely in relationship to the diameter of said bore hole and producing an indication proportional to the current through said impedance, whereby a specific resistivity log of said strata can be made.

GEORGE S. BAYS.